Jan. 16, 1951 J. E. REID 2,538,125
POLYGRAPH
Filed Nov. 19, 1945 3 Sheets-Sheet 1
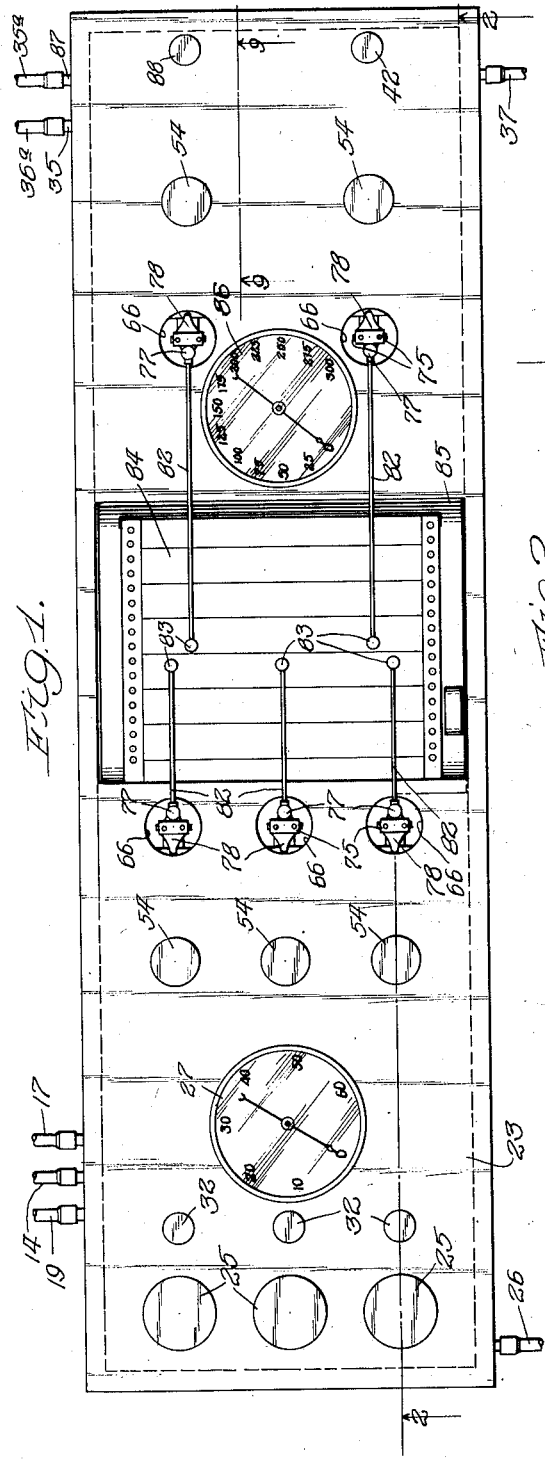
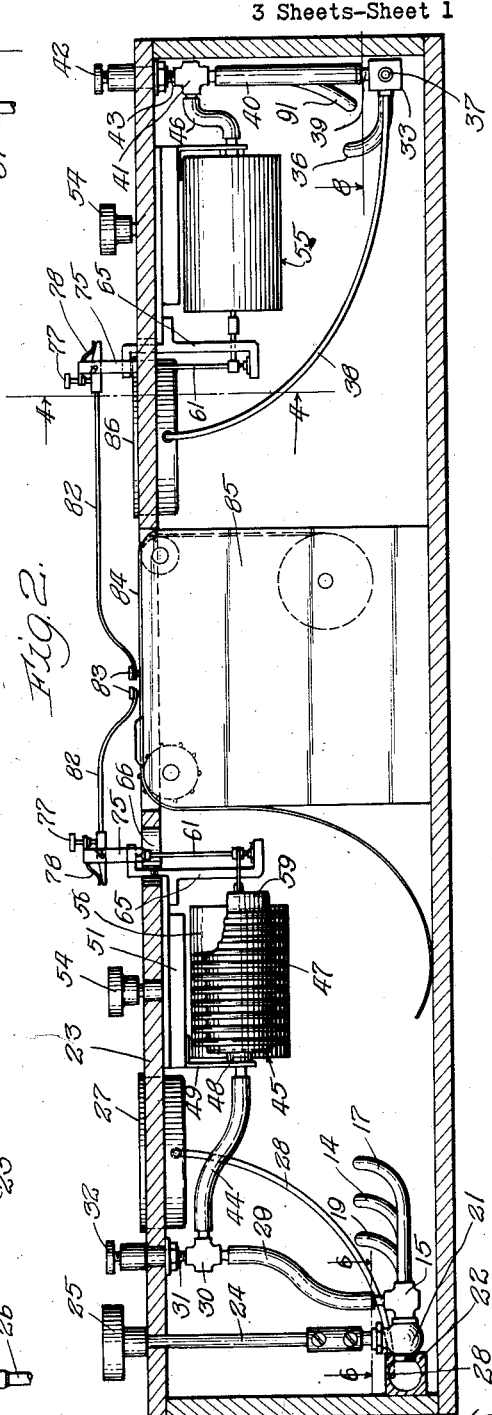
Inventor:
John E. Reid,
By Chritton, Wiles, Schroeder, Merriam & Hofgren, Attys.

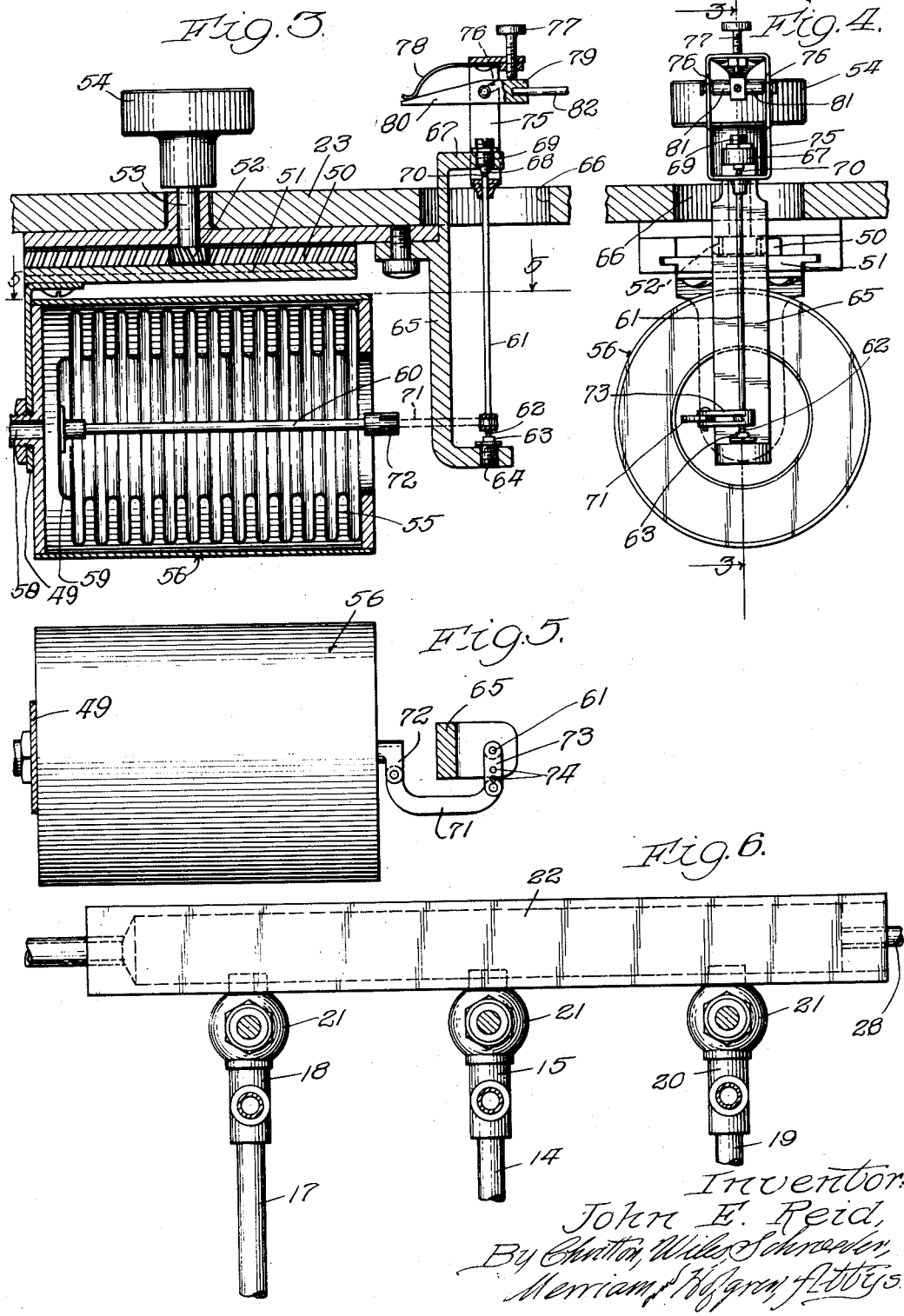

Jan. 16, 1951 J. E. REID 2,538,125
POLYGRAPH
Filed Nov. 19, 1945 3 Sheets-Sheet 3
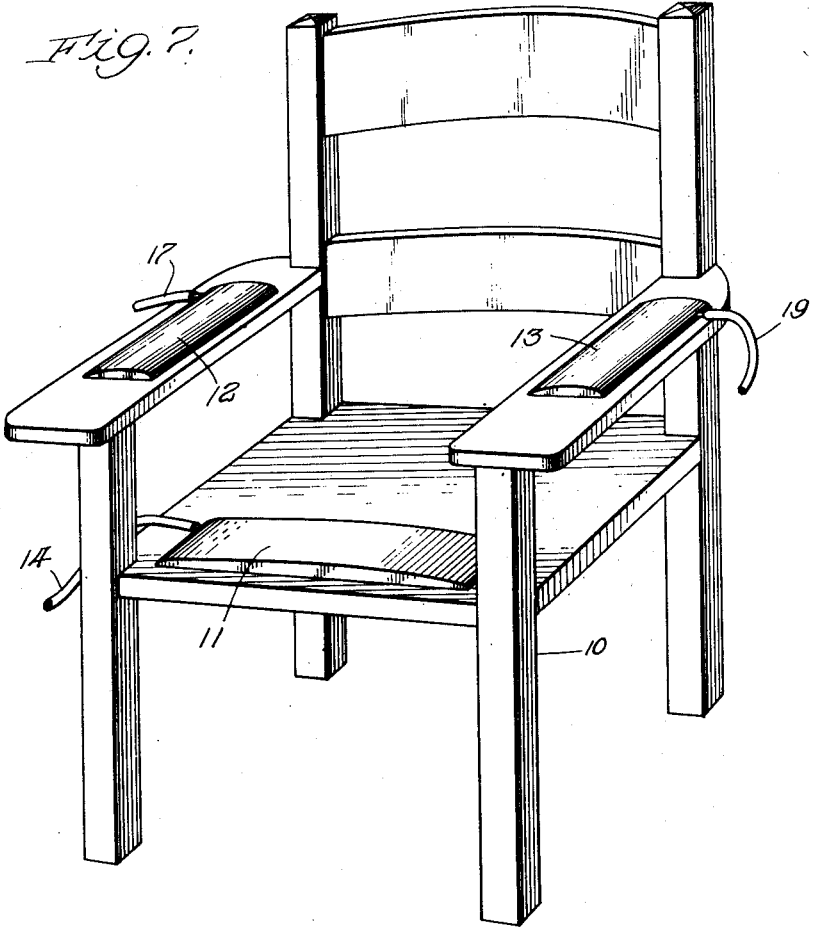
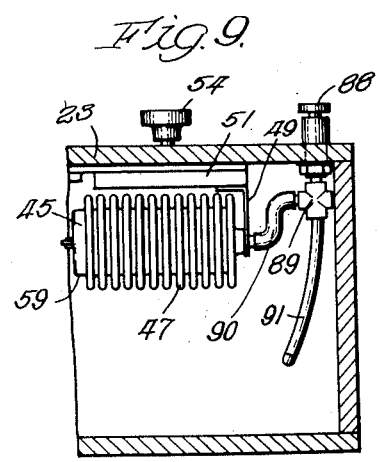
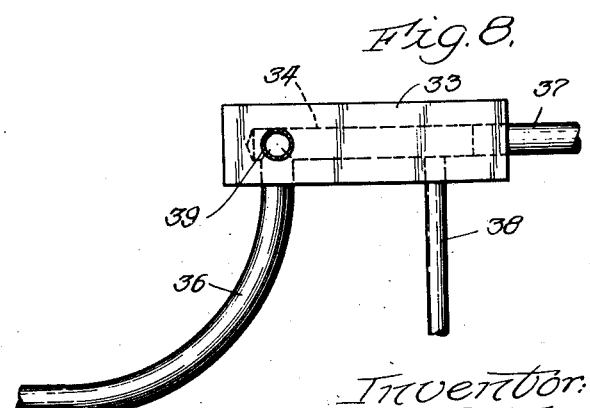
Inventor:
John E. Reid
By Christen, Wiles Schroeder,
Merriam, Hofgren, Attorneys.

Patented Jan. 16, 1951

2,538,125

UNITED STATES PATENT OFFICE 2,538,125

POLYGRAPH

John E. Reid, Chicago, Ill.

Application November 19, 1945, Serial No. 629,615

15 Claims. (Cl. 128—2.05)

This invention relates to polygraph apparatus for recording bodily changes in a subject under observation, and relates particularly to apparatus for recording muscular activity of said subject to be employed in conjunction with the usual blood pressure, pulse cycle and respiration cycle measurements.

Polygraph apparatus is widely used in scientific crime detection during questioning of a suspect. The apparatus indicates bodily changes in the subject, and indicates when he is under great emotional stress caused by making false statements. The equipment used in the past has been principally concerned with recording blood pressure, pulse and respiration cycles under the theory that when the subject is making false statements his respiration changes and his blood pressure increases. Statistics indicate, however, that in about 20% of the cases the results obtained are not acceptable. There is also a probable error in an additional 10% of the cases caused by misinterpretation. The reason for these inconclusive results has been attributed to a physical or mental defect in the subject under examination, but it has been found that in the majority of cases the irregularities in the blood pressure tracings have been induced by muscular control. This muscular control is ordinarily exercised in the hands, arms, feet, legs, or thighs, as any control in the trunk, and particularly the chest, would be recorded on that portion of the apparatus recording the respiration cycles. In order to record any muscular action in the subject I have developed an apparatus in which any muscular change in the extremities of the subject is recorded. This is preferably done by providing inflatable elastic members to be placed under the large muscles in each forearm and against the bottom portions of the thighs, preferably near the legs. After the inflatable members are inflated any changes in internal pressure caused by muscular movement are recorded, and this recording is preferably done on the same moving recording sheet where the respiration and blood pressure-pulse cycles are indicated. In order to record simultaneously blood pressure, pulse and respiration cycles and muscular movement, I have invented an improved apparatus that occupies small space, that is easily assembled, and that will record false blood pressure-pulse changes which are due to muscular movement as well as to record muscular movement patterns of deception.

The invention will be described as related to the embodiment shown in the accompanying drawings. Of the drawings, Fig. 1 is a plan view of the control panel of the apparatus; Fig. 2 is a vertical section taken along line 2—2 of Fig. 1; Fig. 3 is a vertical section taken through the center of one tambour, said section being taken along line 3—3 of Fig. 4; Fig. 4 is a vertical section taken along line 4—4 of Fig. 2; Fig. 5 is a horizontal section taken along line 5—5 of Fig. 3; Fig. 6 is a horizontal section taken substantially along line 6—6 of Fig. 2; Fig. 7 is a perspective view of a chair with inflatable elastic members positioned to respond to muscular movement; Fig. 8 is a horizontal section taken along line 8 of Fig. 2; and Fig. 9 is a sectional elevation taken along line 9—9 of Fig. 1 and showing a portion of the apparatus for recording respiration.

As shown in the accompanying drawings, the apparatus includes a chair 10 with an inflatable elastic bag 11 extending across the front of the chair seat for contacting the under side of the thighs of the subject. There is provided on the arms of the chair a second inflatable elastic bag 12 for a forearm and a third inflatable elastic bag 13 for the other forearm of the subject. There is also provided an ordinary physician's blood pressure bag (not shown) for recording blood pressure cycles, and an ordinary pneumograph tube (not shown) attached about the subject's body where there is greatest bodily movement caused by breathing to record respiration cycles both these structures being ordinarily provided in prior polygraph apparatus. The place of attachment of the pneumograph tube will usually be at the chest.

The elastic bag 11 for the thigh is connected by a rubber hose 14 to a branch 15 of a manifold 22; a second rubber hose 17 leads from the elastic bag 12 for one forearm to a second branch 18 of the same manifold 22; while a third rubber hose 19 leads from the elastic bag 13 for the other forearm to a third branch 20 on this manifold 22. Each branch of the manifold has a valve 21 such as a stop-cock connecting the branch to the main portion 22 of the manifold. The manifold 22 is mounted horizontally beneath a control panel 23 of the apparatus (Fig. 2). The valves 21 are each controlled by a vertical rod 24 extending vertically from its corresponding valve through the control panel 23. On the end of each rod 24 is a knob 25 for turning the valve. The main portion of the manifold 22 is connected by a rubber tube 26 (Fig. 1) to a source of air pressure that can be used for inflating the elastic bags 11, 12, and 13. Because of the valve arrangement on the manifold each bag may be inflated separately while the other bags are shut off by means of their valves. There is also provided a manometer 27 connected to the manifold by a rubber tube 28 that can be used to indicate the air pressure within the manifold and each of the elastic bags.

Each of the manifold branches, 15, 18, and 20, has a second passageway connected by means of a rubber tube 29 to pressure relief valve 30. These pressure relief valves, which are three in number corresponding to the branches 15, 18 and 20, are used for releasing the air pressure within the tubes 14, 17, and 19, and thereby deflating the inflatable elastic bags 11, 12, and 13. The pressure relief valves 30 are mounted under the control panel 23 (Fig. 1) and each has a post 31 extending through the panel 23 each of which can be turned by means of a knob 32 mounted above the top surface of the control panel 23 (Fig. 1). By means of the posts 31 and knobs 32 the pressure relief valves 30 may be opened and closed.

In the apparatus there is also provided at the right hand side (Fig. 2) a control box 33. The control box has a central portion 34 (Fig. 8) communicating by means of a rubber tube 36 with the usual blood pressure bag through a pipe 35 extending through the side of the box on which the control panel 23 is mounted. A tube 36a leads to the blood pressure bag. This blood pressure bag is of the usual type and is ordinarily provided in polygraph apparatus. A second tube 37 (Fig. 8) leads from the central portion 34 and is adapted to be connected with an ordinary and usual bellows (not shown) for inflating the blood pressure bag. A third tube 38 is provided communicating with a manometer 86 for indicating air pressure within the blood pressure system. At the top of the control box 33 there is a short extension 39 to which is attached a rubber tube 40 leading to a pressure relief valve 41 mounted underneath the control panel 23. This pressure relief valve has a stem 43 extending through the control panel to which a knob 42 is attached. A rubber tube 46 leads from the pressure relief valve 41 to a closed tambour 55. The pressure relief valve 41 is used to deflate the blood pressure bag when it is not in use or when it is not desired to record the blood pressure.

The pneumograph tube for recording respiration is connected through a rubber tube 35a, pipe 87, and rubber tube 91, to another pressure relief valve 89 like valve 41. This valve also has a control knob 88 and has a rubber tube 90 leading to an open tambour as shown in Fig. 9. No inflating means is needed here as the ordinary pneumograph tube operates on entrapped air only. The pressure relief valve in the pneumograph system is used to open the system when it is not desired to make recordings.

The tambours connected to the two forearm bags 12 and 13 and the pneumograph tube, a total of three tambours, are of the open construction, as shown on the left hand side of Fig. 2 and in Fig. 9. The tambours connected to the thigh bag 11 and blood pressure bag, a total of two tambours, are of the closed construction as shown at the right hand side of Fig. 2 and in Figs. 3 and 4. Thus there are five tambours in all, three of the open type and each exactly like the others, and two of the closed type and each exactly like the other.

The three open tambours of the type shown at 47 are mounted with their normally open end 48 abutting against a vertical bracket 49. The end of one of the rubber tubes 44 and 90 passes through this bracket and communicates with the interior of the tambour. The bracket 49 is mounted on a rack bar 50 arranged with its longitudinal axis parallel with the longitudinal axis of the tambour. The rack bar 50 is slidably held by side guide 51 and engaged by a pinion 52. The side guides 51 are mounted on the under-side of the control panel 23, and the rack is held on a bar 53 extending through the control panel. At the top end of the rod is mounted a knob 54 by which the pinion may be turned. Thus by turning the knob 54 the rack 50 is moved, thereby moving the tambour 47.

Each of the enclosed tambours 55 is held within a cylinder 56 having a plate closing one end of the cylinder and attached to the bracket 49 (Fig. 3). This plate has a central opening 58 connected to one of the rubber tubes 44 and 46 leading to the thigh bag 11 or the blood pressure bag. Each tambour 55 is mounted on the opposite open end of the cylinder 56 with the tambour's closed end 59 adjacent the cylinder plate. The cylinder is also held at its closed end on the vertical bracket 49 that is attached to a rack bar 50. The rack is held in side guide 51, and is engaged by a pinion 52 that can be turned by means of a rod 53 having a knob 54 on its opposite end and above the control panel 23.

As can be seen from the above description, variations in air pressure within the various inflatable elastic bags serve to elongate and collapse the various tambours. Each of the open tambours 45 has this air pressure operating on the inside of the tambour while each of the enclosed tambours 55 has this air pressure operating on its outside surface. The enclosed tambours are intended to be used where relatively great pressure will be exerted on its corresponding elastic bag. In the present apparatus this occurs at the thigh bag 11, and in the blood pressure bag.

Each tambour of the five tambours employed has a rod 60 attached to its closed end 59 and extending at right angles to this closed end. This central rod 60 is operatively attached at its free or outer end to a second rod 61 arranged substantially at right angles to the first rod 60. The second rod 61 has a sharpened lower end 62 pressing against a jeweled bearing 63. The jeweled bearing is mounted on the end of a threaded rod 64 held in a right angled bracket 65. The portion of the bracket 65 that holds the bearing 63 is arranged horizontally, while the rest of the bracket is in vertical alignment and is attached to the bottom of the control panel 23. The top end of the bracket 65 extends through a hole 66 in the panel 23, and this end has a second horizontal end 67, also holding a jeweled bearing 68 on the under-side of a threaded rod 69 extending through the horizontal end 67. The rod 61 has a sharpened top end 70 contacting the jeweled bearing 68. Thus the rod 61 is held between the jeweled bearings 63 and 68 which are adjustable toward and away from each other by their threaded mountings 64 and 69.

The first rod 60 and second rod 61 are operatively connected so that longitudinal movement in rod 60 caused by expansion and contraction of the tambour sets up rotational movement in the second rod 61. In order to accomplish this there is provided a linkage 71 rotatably attached to a right angled projection 72 on the end of rod 60 and a second right angled projection 73 on the lower end of rod 61. These projections are substantially horizontal and are parallel to each other. The second projection 73 has three aligned holes 74 toward its outer end so that the linkage 71 can be attached to any desired hole. This construction is provided so that by changing the connection of the linkage 71 from one hole to another, the amount of rotational movement of rod 61 can be adjusted. The outermost hole gives the least rotational movement, while the innermost hole gives the greatest rotational movement. The linkage 71 is curved so as to pass around the bracket 65.

At the top of the second rod 61 and beneath the top curved end 67 there is located a rectangular mounting 75 whose sides are flat plates with opposite plates parallel to each other. The bottom of the rectangular mounting 75 is fastened to the rod 61 immediately beneath the top sharpened end 70. The vertical sides of the rectangular mounting 75 pass on either side of the top horizontal end 67 of the bracket 65 and are spaced therefrom a sufficient distance to permit movement of the rod 61 and mounting 75 over a relatively large arc. Near the top of the vertical side portions of the rectangular mounting 75 are located downwardly inclined slots 76 with one slot in each side portion and both slots arranged parallel to each other. The top portion of the rectangular mounting is extended toward the right (Fig. 3) and serves to hold a vertical screw 77. Also mounted on the under-side of the rectangular mounting's top portion is a downwardly extending spring 78. The screw 77 and spring 78 press against a bar 79 having a downwardly sloping end portion 80. The bar 79 is held by means of right-angled projections 81 extending from either side of the bar 79 and engaging the slots 76. On the end of the bar 79 opposite its sloping end 80 there is mounted a horizontal rod 82. The free end of the rod 82 is bent downward, and has a stylus 83 attached to its extreme free end. All of the tambours have connecting rods and mountings like those described above. The variations in air pressure within the various tambours are recorded on a paper 84, moved by a kymograph 85. The styli are arranged for contacting the paper 84 and are designed to be filled with ink. As shown in Fig. 1, the horizontal rods 82 are arranged substantially parallel to the longitudinal axis of the control panel 23 and the paper 85 is moved parallel to the longitudinal axis of the control panel. The tambours are aligned transversely to the control panel 23 and on opposite sides of the kymogragh, which is approximately in the center of the apparatus. The tambours for the arms and thigh are arranged on one side of the kymograph (the left hand side as shown in Figs. 1 and 2), while the tambours for the blood pressure and respiration are arranged on the other side of the kymograph.

In operating the apparatus the blood pressure bag, arm bags 12 and 13, and thigh bag 11 are inflated while the pneumograph tube pressure relief valve 89 is closed. The tambours are adjusted to a desired position by means of the rack and pinion on each tambour by turning each knob 54 as required, and the horizontal rods 82 are adjusted by means of screws 77 so that each stylus 83 just contacts the paper 84. The apparatus is then ready for operation. The arm bags 12 and 13 are preferably inflated to about 18 millimeters of mercury pressure while the thigh bag is inflated to approximately 30 millimeters of mercury pressure. The blood pressure bag is inflated to approximately 90 millimeters of mercury pressure. These pressures can of course be changed, but it has been found that the ones stated are desirable in the majority of cases. In preparing the apparatus for recording muscular movement in one or more limbs of the subject being examined, the subject is placed in the chair 10, shown in Fig. 7, with his thighs resting on the thigh bag 11, his right forearm on the arm bag 12 and his left forearm on the arm bag 13. The thigh and arm bags 11, 12 and 13 are inflated individually through an inflating apparatus, such as an ordinary rubber air pump, connected to the rubber tube 26 which leads to the manifold 22. In inflating the thigh bag 11, the rubber tube 17 leading to arm bag 12 and tube 19 leading to arm bag 13 are closed off by closing the two corresponding valves 21 through rotation of rods 24 by means of knobs 25. The valve 21 for the thigh bag rubber tube or conduit 14 is left open and in communication with the interior of the manifold 22. Air is then pumped into the manifold 22 through tube 26, with this air flowing through conduit 14 to the thigh bag 11. The air pressure in the thigh bag is recorded on the manometer 27. As soon as the desired air pressure has been achieved, thigh bag conduit 14 is closed off from the manifold 22 by closing the corresponding valve 21.

Each of the arm bags 12 and 13 is inflated through its corresponding rubber tube or conduit 17 or 19 in the same manner as that described in the preceding paragraph for thigh bag 11. In other words, the manifold 22 is used for feeding air to either of conduits 17 or 19, while the corresponding valve 21 is open and the other two valves 21 are closed. When the thigh bag 11 and arm bags 12 and 13 have been inflated to the desired pressure, as will be shown during the inflation on the manometer, all three valves 21 are in closed position so that none of the bags 11, 12 and 13 are in communication with the manifold 22.

After the thigh and arm bags 11, 12 and 13 have been inflated to the desired pressure, as described above, the tambours are adjusted by rotating the knobs 54 in the manner previously described so that the stylus rods 82 are substantially parallel to each other and substantially parallel to the longitudinal axis of the apparatus as shown in Fig. 1. Questions are then asked of the subject being examined. Any movement of either or both legs of the subject in an attempt to control his respiration or the like and give a false result on the apparatus either increases or decreases the pressure on the thigh bag 11. As the bag is inflated with air, this movement causes surges of air pressure through the thigh bag conduit 14, corresponding rubber tube 29, corresponding open valve 30, corresponding rubber tube 44 and into its tambour 55. These changes in air pressure caused by leg movement of the subject cause the tambour to expand or contract, thereby moving central rod 60 (Fig. 3) longitudinally of the tambour. This movement of the rod 60 causes rotational movement of the rod 61 and arcuate rotational movement of the corresponding rod 82. This causes the corresponding stylus 83 to mark a wavy line on the paper 84, which is being moved by a kymograph 85.

The detailed description given in the preceding paragraph is to explain the recording of movement in the leg or legs of the subject being examined. Muscular movement in the right arm of the subject is similarly recorded through the arm bag 12, arm bag conduit 17, corresponding tube 29, corresponding open valve 30, corresponding tube 44 and tambour 47. As has been previously explained, movement of the tambour causes arcuate movement of the corresponding stylus arm 82 and thus records on the strip of paper 84. In a similar manner, muscular movement of the left arm of the subject is recorded by changing pressure on the arm bag 13, which is also recorded on the moving paper 84.

The apparatus shown and described herein can be used alone or in conjunction with galvanic apparatus for recording skin changes. It can also be used in the medical and insurance fields as the apparatus immediately detects any falsity in the blood pressure results caused by muscular movement in the limbs of the subject.

Having described my invention as related to one embodiment of the same, it is to be understood that the invention is not limited by any of the details of description unless otherwise specified, but rather is to be construed broadly within its spirit and scope, as set out in the accompanying claims.

I claim:

1. Polygraph apparatus for recording bodily changes in a subject under observation comprising means for recording muscular movement in the arms and legs of the subject comprising an inflatable elastic member to be held against the large muscles on one forearm of the subject, a second inflatable elastic member to be held against the large muscle on the other forearm, a third inflatable member to be held against the large muscles on the underside of the thighs of the subject, and separate conduits from each inflatable member leading to separate tambours, said tambours each having a stylus attached to the closed end of said tambour and contacting a movable recording sheet for recording movement of the various muscles.

2. The apparatus of claim 1 wherein a manifold is provided with branches interposed in each conduit, valve means between the manifold and each branch for connecting and disconnecting said branches from said conduits, and inflating means attached to the main portion of said manifold for inflating said conduits and said inflatable members through said valves.

3. The apparatus of claim 2 wherein a manifold is provided with branches interposed in each conduit, valve means between the manifold and each branch for connecting and disconnecting said branches from said conduits, inflating means attached to the main portion of said manifold for inflating said conduits and said inflatable members through said valves, and a manometer attached to the main portion of the manifold for indicating air pressure within the manifold.

4. The apparatus of claim 2 wherein the tambours on the arm conduits are of open construction with the conduit on each tambour communicating with the interior of the tambour, and wherein the tambour on the thigh conduit is enclosed in a cylinder closed at one end with the conduit attached to this end and the other end of the cylinder is closed by the open end of the tambour.

5. The apparatus of claim 2 wherein the tambours on the arm conduits are of open construction with the conduit on each tambour communicating with the interior of the tambour, and wherein the tambour on the thigh conduit is enclosed in a cylinder closed at one end with the conduit attached to this end and the other end of the cylinder is closed by the open end of the tambour, each of said open tambours being mounted on a rack extending parallel to the longitudinal axis of the tambour and slidably held in a bracket with the rack contacting a pinion for positioning the tambour, and said cylinder of the closed tambour is mounted on a similar rack contacted by a similar pinion.

6. Polygraph apparatus for recording bodily changes in a subject under observation comprising a blood pressure conduit leading to a first tambour, a respiration conduit leading to a second tambour, an inflatable elastic member to be held against the large muscle of the forearm of the subject and a conduit leading to a third tambour, a second inflatable elastic member to be held against the large muscle of the other forearm of the subject and a conduit leading to a fourth tambour, a third inflatable elastic member to be held against the large muscles on the under side of the thighs of the subject toward the knees and a conduit leading to a fifth tambour, and means attached to each tambour for recording variations in pressure within the conduits on a single recording sheet.

7. The apparatus of claim 6 wherein there is provided a pressure relief valve in the respiration conduit, a second pressure relief valve in the blood pressure conduit, both said valves opening to the atmosphere, means for inflating the blood pressure conduit, and a manometer attached to the blood pressure conduit for indicating air pressure therein.

8. The apparatus of claim 6 wherein a manifold is provided with a branch interposed in one forearm conduit, a second branch interposed in the other forearm conduit, a third branch interposed in the thigh conduit, separate valve means in each branch for connecting and disconnecting said branch from its conduit, inflating means attached to the main portion of said manifold for inflating the conduits, and a manometer attached to the manifold for indicating air pressure therein.

9. The apparatus of claim 6 wherein there is provided a pressure relief valve in the respiration conduit, a second pressure relief valve in the blood pressure conduit, both said pressure relief valves opening to the atmosphere, inflating means attached to the blood pressure conduit, a manometer for indicating air pressure therein, a manifold with a branch interposed in one forearm conduit, a second branch interposed in the other forearm conduit and a third branch interposed in the thigh conduit, separate valve means in each branch of the manifold for connecting and disconnecting said branch from its conduit, inflating means attached to the main portion of the manifold, and a second manometer attached to the manifold for indicating air pressure therein.

10. The apparatus of claim 6 wherein the tambours on the respiration conduit, one forearm conduit and the other forearm conduit are each of open construction with the conduit on each tambour communicating with the interior of the tambour at one end thereof and the recording means is operatively attached to the opposite end of the tambour, and wherein the tambours on the blood pressure conduit and thigh conduit are each enclosed in a cylinder closed at one end with the conduit attached to this end and the other end of the cylinder is closed by the open end of the tambour, and with the recording means being operatively attached to the closed end of the tambour, each of said open tambours being mounted on a rack extending parallel to the longitudinal axis of the tambour and slidably held in a bracket with the rack contacting a pinion for positioning the tambour, and said cylinder of the closed tambour is mounted on a similar rack contacted by a similar pinion.

11. Polygraph apparatus for recording bodily changes in a subject under observation comprising a blood pressure conduit leading to a first tambour and a respiration conduit leading to a second tambour, means for inflating the blood pressure conduit, a manometer for indicating air pressure therein, an inflatable elastic member to be held against the large muscle of the forearm of the subject and a conduit leading to a third tambour, a second inflatable elastic member to be held against the large muscle of the other forearm and a conduit leading to a fourth tambour, a third inflatable member to be held against the large muscles on the under side of the thighs of the subject toward the knees and a conduit leading to a fifth tambour, a manifold with a branch interposed in one forearm conduit, a second branch interposed in the other forearm conduit and a third branch interposed in the thigh conduit, separate valve means in each branch of the manifold for connecting and disconnecting said branch from its conduit, inflating means attached to the main portion of the manifold for inflating the conduits, and a manometer attached to the manifold for indicating air pressure therein, said second, third, and fourth tambours being each of open construction with the conduit on each tambour communicating with the interior of the tambour at one end thereof, and the first and fifth tambours are each enclosed in a cylinder closed at one end with the conduit attached to this end and the other end of the cylinder is closed by the open end of the tambour, each of said open tambours being mounted on a rack extending parallel to the longitudinal axis of the tambour and slidably held in bracket with the rack contacting a pinion for positioning the tambour with the tambour held by the mounting at a point adjacent its conduit, each of said cylinders of the closed tambours being mounted on a similar rack contacted by a similar pinion, and separate recording means operatively attached to the closed end of each tambour and contacting a movable recording sheet for recording variations of pressure within the separate conduits.

12. The apparatus of claim 11 wherein there is provided a pressure relief valve in each conduit with each valve opening to the atmosphere.

13. Apparatus for recording pressure changes comprising a tambour rigidly held at one end and subject to varying pressures serving to elongate and contract the tambour, a rod means connected to the movable end of the tambour, a second rod means substantially at right angles to said first rod means, a linkage means connecting the two rod means for imparting rotational movement to the second rod means upon longitudinal movement of the first rod means, a third rod means rigidly held by the second rod means substantially at right angles thereto, and a marking stylus at the free end of the third rod means, said linkage means comprising a short link rigidly held substantially at right angles to the second rod means at a point adjacent the first rod means and a connecting link extending from the first rod means to the short link and rotatably held by the first rod means and the short link.

14. The apparatus of claim 13 wherein said second rod means has one end formed of two parallel plates arranged side by side, each having parallel slots arranged side by side and inclined toward the center of said second rod means, and said third rod means has one end provided with aligned round bars mounted at right angles to the third rod means and extended away from said rod means, the bars engaging said slots with said end of the third rod means arranged between said parallel plates, and adjustable spring means are provided contacting the third rod means at opposite sides of the second rod means for acting upon the confined end of the third rod means and normally urging the round bars to the bottom of the slots, said spring means being held between the outer ends of the two parallel plates and adjustable for varying the angular relationship between the second and third rod means.

15. Polygraph apparatus for recording bodily changes in a subject under observation comprising a blood pressure conduit leading to a first tambour and a respiration conduit leading to a second tambour, means for inflating the blood pressure conduit, a manometer for indicating air pressure therein, an inflatable elastic member to be held against the large muscle of the forearm of the subject and a conduit leading to a third tambour, a second inflatable elastic member to be held against the large muscle of the other forearm and a conduit leading to a fourth tambour, a third inflatable member to be held against the large muscles on the under side of the thighs of the subject toward the knees and a conduit leading to a fifth tambour, a manifold with a branch interposed in one forearm conduit, a second branch interposed in the other forearm conduit and a third branch interposed in the thigh conduit, separate valve means in each branch of the manifold for connecting and disconnecting said branch from its conduit, inflating means attached to the main portion of the manifold for inflating the conduits, and a manometer attached to the manifold for indicating air pressure therein, said second, third and fourth tambours being each of open construction with the conduit on each tambour communicating with the interior of the tambour at one end thereof, and the first and fifth tambours are each enclosed in a cylinder closed at one end with the conduit attached to this end and the other end of the cylinder is closed by the open end of the tambour, each of said open tambours being mounted on a rack extending parallel to the longitudinal axis of the tambour and slidably held in bracket with the rack contacting a pinion for positioning the tambour with the tambour held by the mounting at a point adjacent its conduit, each of said cylinders of the closed tambours being mounted on a similar rack contacted by a similar pinion, and separate recording means operatively attached to the closed end of each tambour and contacting a movable recording sheet for recording variations of pressure within the separate conduits, each of said recording means comprising a rod means connected to the closed end of the tambour, a second rod means substantially at right angles to said first rod means, a linkage means connecting the two rod means for imparting rotational movement to the second rod means upon longitudinal movement of the first rod means, a third rod means rigidly held by the second rod means substantially at right angles thereto, and a marking stylus at the free end of the third rod means, said linkage means comprising a short link rigidly held substantially at right angles to the second rod means at a point adjacent the first rod means and a connecting link extending from the first rod means to the short link rotatably held by the first rod means and the short link.

JOHN E. REID.

REFERENCES CITED

The following references are of record in the file of this patent:

UNITED STATES PATENTS

| Number | Name | Date |
|---|---|---|
| 286,795 | Edwards | Oct. 16, 1883 |
| 1,788,434 | Keeler | Jan. 13, 1931 |
| 2,235,894 | Lee | Mar. 25, 1941 |

FOREIGN PATENTS

| Number | Country | Date |
|---|---|---|
| 729,004 | France | July 16, 1932 |